United States Patent [19]

Folk et al.

[11] Patent Number: 4,997,173

[45] Date of Patent: Mar. 5, 1991

[54] ROTARY WIRE SELECTION AND FEED APPARATUS

[75] Inventors: Kenneth F. Folk; Daniel T. Adlon, both of Harrisburg, Pa.

[73] Assignee: AMP Incorporated, Harrisburg, Pa.

[21] Appl. No.: 484,709

[22] Filed: Feb. 26, 1990

[51] Int. Cl.[5] .......... B23Q 1/04

[52] U.S. Cl. .......... 269/56

[58] Field of Search .......... 29/742, 748, 753, 759, 29/569.1, 569.9, 564.6, 35.5; 269/56, 57, 903; 226/120

[56] References Cited

U.S. PATENT DOCUMENTS

| | | | |
|---|---|---|---|
| 3,693,250 | 9/1972 | Brorein et al. | 29/755 |
| 4,247,980 | 2/1981 | Tominoi | 29/753 |
| 4,622,733 | 11/1986 | Fukuda et al. | 29/748 |

FOREIGN PATENT DOCUMENTS

| | | | |
|---|---|---|---|
| 2190715 | 12/1984 | United Kingdom | 29/755 |

*Primary Examiner*—Robert C. Watson
*Attorney, Agent, or Firm*—James M. Trygg

[57] ABSTRACT

The present invention relates to a wire selection and feed apparatus for use in an automated machine for making electrical cables. The apparatus includes a rotary turret having a plurality of wire holders angularly spaced about its periphery. The desired wire is selected by rotating the turret until the appropriate wire holder is in the feed, or select, position. The wire holder is then advanced thereby presenting the end of the selected wire to a work station for processing. At this point the wire may be fed a desired amount into the work station by bringing a wire feed until into feeding engagement with the wire.

11 Claims, 10 Drawing Sheets

ROTARY WIRE SELECTION AND FEED APPARATUS

The present invention relates to a wire selection and feed apparatus having a turret for rotating a selected wire into position for feeding the wire to a processing station. The apparatus is suitable for functioning in conjunction with an automated lead making or cable making machine.

BACKGROUND OF THE INVENTION

A commonly known type of harness making machine is shown in U.S. Pat. No. 4,628,600 which issued Dec. 16, 1986 to Gordon, et al. and which is hereby incorporated by reference as if set forth verbatim herein. The machine of Gordon feeds a single wire, taken from a so-called "endless source," such as a reel of wire, to a cutting station for cutting into segments. Each segment receives a terminal on one end, which is crimped in place in the usual manner, and the other end is inserted into a cavity of a connector housing When the desired number of discrete wire segments are prepared and inserted into the connector housing, the completed assembly is ejected and the process repeated for the desired number of times. Machines of this type are capable of feeding only a single wire and are not capable of selecting a wire of a particular type from a plurality of available wires and feeding that selected wire. U.S. Pat. No. 4,879,934, issued Nov. 14, 1989 to Adlon, et al. and assigned to the assignee of the present invention, is hereby incorporated by reference as if set forth verbatim herein. This patent discloses such a selective wire feeding device. The feeding device accommodates six different wires, any one of which may be selected and fed by a two belt feeding mechanism. The fed wire passes through a single wire passageway to a harness making machine for processing. When a wire segment of the desired length is severed, the stub remaining on the source side of the wire is retracted back into the single wire passageway so that one of the other wires may be subsequently selected and fed. U.S. Pat. No. 4,774,761, which issued Oct. 4, 1988 to Reinertz discloses a wire selection and feed apparatus having pivotal arcuate wire guiding segments. Each segment has a series of holes which are formed on a given radius from the pivot and arranged to receive wires therethrough, one wire in each hole of a segment. Each hole of one segment is in alignment with corresponding holes in the other segments so that each wire may be threaded through an appropriate hole in each segment. A belt feed apparatus is positioned between two of the segments so that as the segments are pivoted, each wire in turn may be brought into feeding engagement with the belt feed apparatus.

One problem associated with both of these wire selection and feeding devices is that in order to prepare the end of the wire for termination the wire must be firmly clamped and the stripping and cutting tool closed about the wire and then withdrawn in an axial direction to remove the insulation. This results in a complex wire stripping and cutting mechanism. Additionally, the device of Reinertz requires a mechanism to transport the end of the wire from the last wire guide segment to the wire stripping and cutting mechanism and to a press for subsequent termination.

The present invention overcomes these drawbacks by providing a wire holder for each wire that is threaded into the wire selector. The selector having the ability to advance the holder of a selected wire to present the end of the wire to a work station, and to withdraw the wire end by withdrawing the holder.

SUMMARY OF THE INVENTION

The present invention relates to a wire selecting and feeding apparatus in an automated cable making or lead making machine having at least one processing station for processing an end of a wire selected from a plurality of different wires. The apparatus includes a frame attached to the machine and a turret journaled for rotation with respect to the frame about a turret axis. A plurality of wire holders are provided, each being associated with the turret and angularly spaced about its axis. Each holder is arranged to hold one of the plurality of wires in a position so that the wire's longitudinal axis for a portion of the wire is approximately parallel to the turret axis. Means is provided for rotating the turret until one wire holder having a selected wire is in a feed position. Means is provided for moving only the one wire holder in a direction toward the processing station and in an opposite direction. Further, means is provided for engaging the portion of the selected wire and moving the wire along its longitudinal axis a desired amount in a direction toward the processing station.

DESCRIPTION OF THE PREFERRED EMBODIMENT

Figure 1:
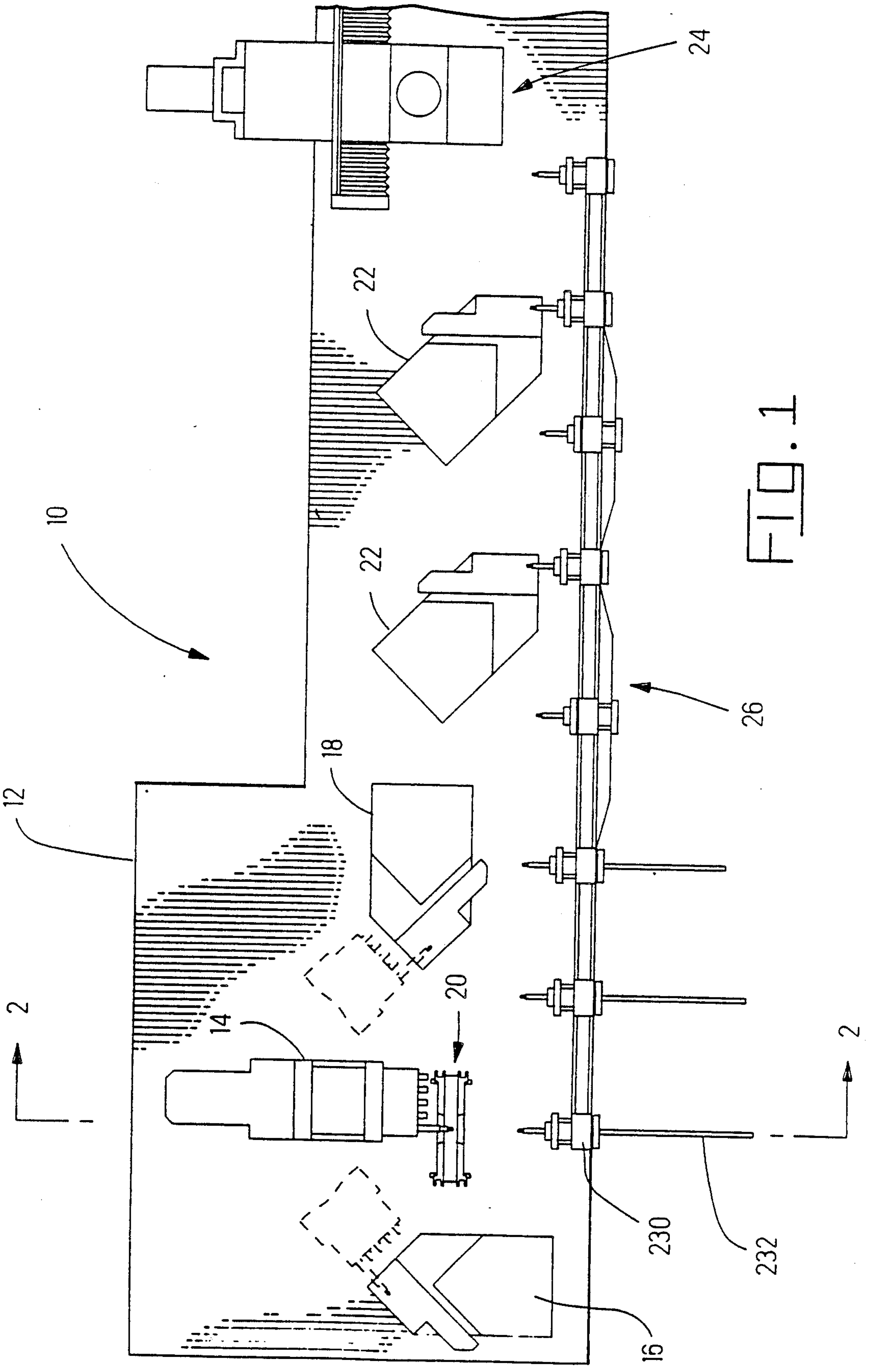
FIG. 1 is a schematic representation of the major functional components of an electrical cable making machine which illustrates the teachings of the present invention.

The major functional elements of an electrical cable making machine 10 required in the making of a cable in accordance with the teachings of the present invention are schematically depicted in FIG. 1. The machine 10 includes a bed 12 arranged to support a wire selection and feed unit 14, two presses 16 and 18, one on either side of the unit 14 for applying terminals to the end of a wire, and a wire cutting and stripping station 20. Also included are one or more downstream presses 22, optionally a block loader station 24 for inserting a wire end and associated terminal into a connector housing, and a conveyor system 26 for transporting cut wire segments from the cutting station 20 to the presses 22 and block loader station 24. The machine 10 is program controlled by means of a computer, or the like, in a manner that is well known in the art. With the exception of the wire selection and feed unit 14, all of the other presses, stations, and conveyor are well known in the art, as is exemplified in the Gordon, Adlon, and Reinertz patents and, therefore, will not be described in further detail here.

Figure 2:
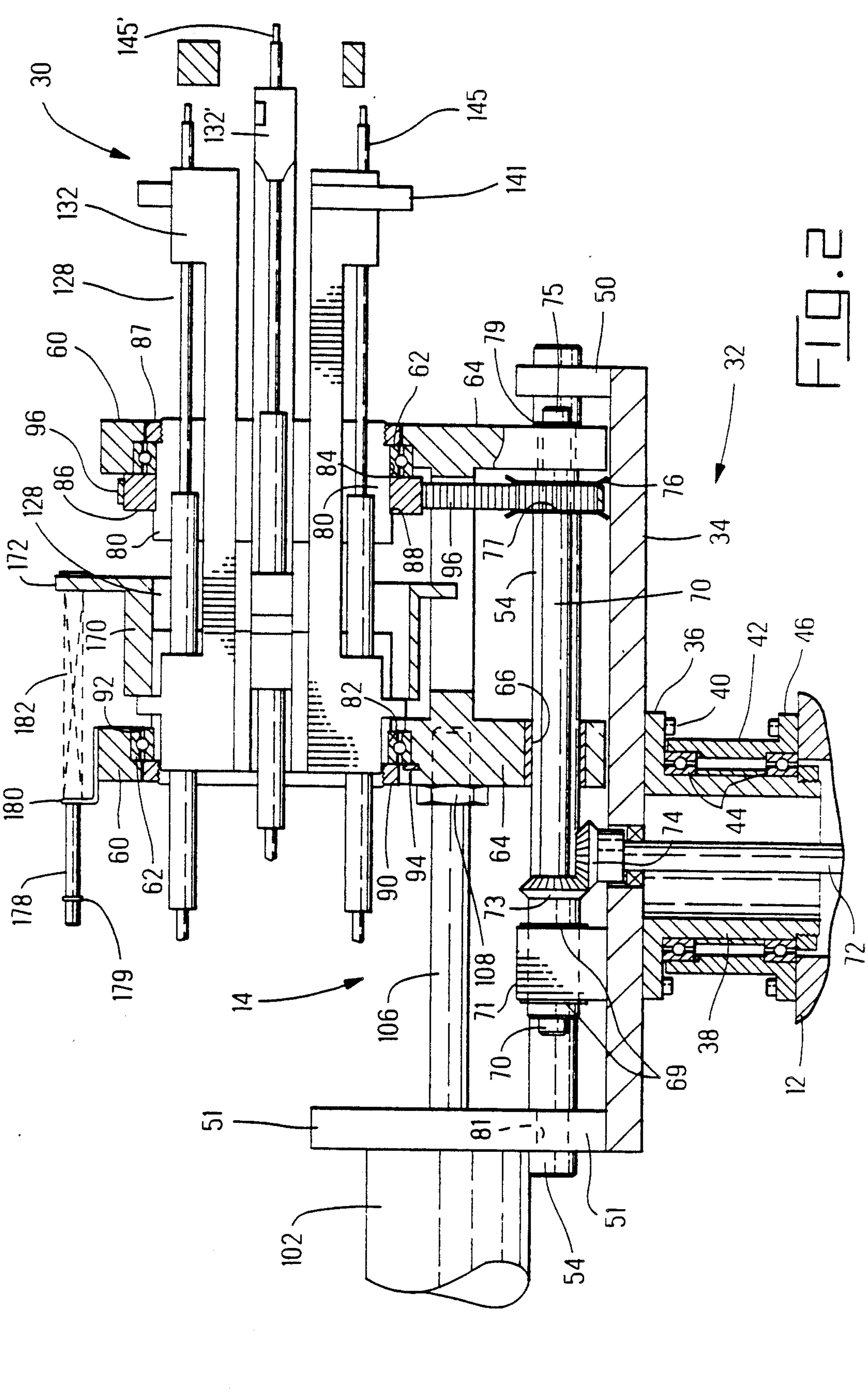
FIG. 2 is a partial sectional view of a wire selection and feed unit taken along the lines 2—2 of FIG. 1.
Figure 2A:
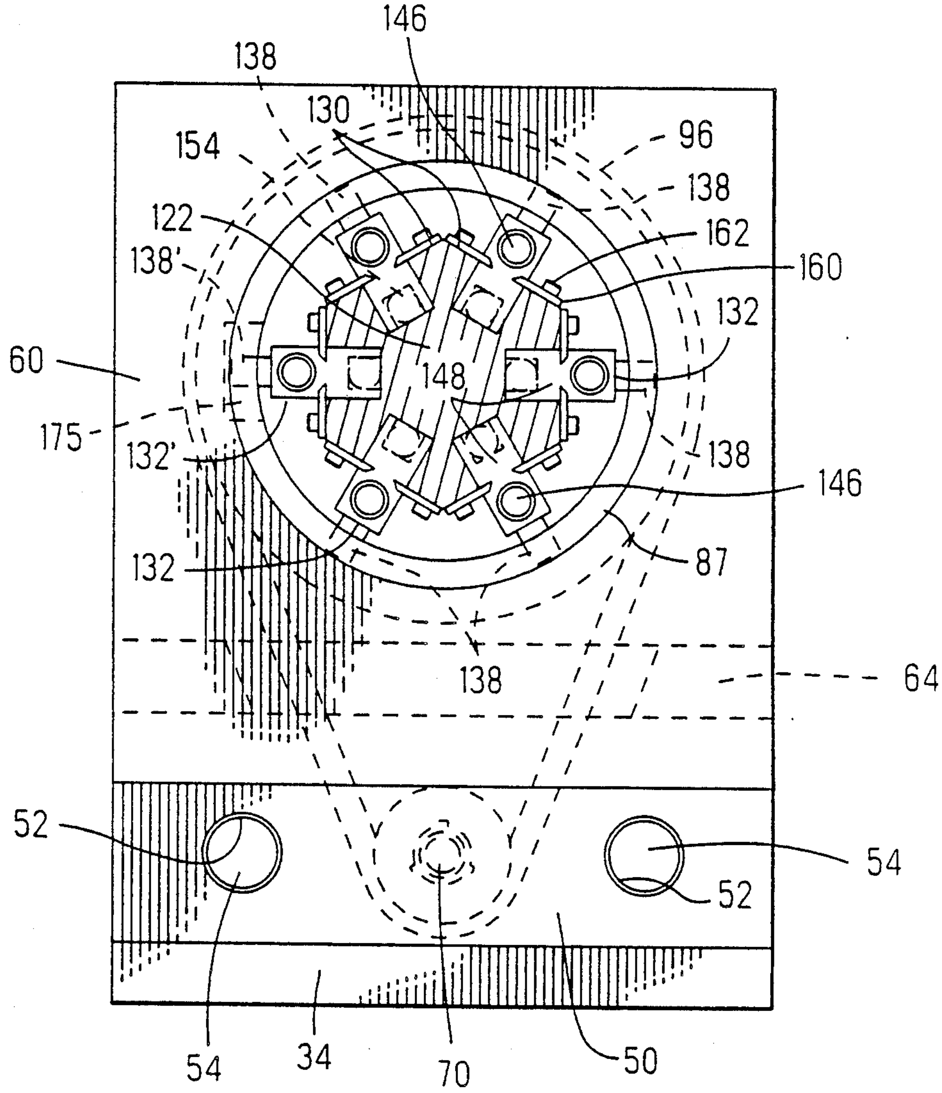
FIG. 2A is an end view of the apparatus of FIG. 2.

As stated above, the subject of the present invention is the wire selection and feed unit 14 in combination with the automated cable making machine 10. FIG. 2 is a side view of the wire selection and feed unit 14 showing the turret assembly 30 and the turret base 32. As is shown, the turret base 32 includes a base support plate 34 attached to a flange 36 of a hub 38 by means of the screw fasteners 40. The hub 38 is journaled for rotation in an outer hub 42 by means of the bearings 44. The outer hub 42 includes a mounting flange 46 which is securely attached to the bed 12 of the machine 10. The bearings 44 permit pivoting of the wire selection and feed unit 14 to selectively present a wire end to either the press 16 or the press 18, as is illustrated in FIG. 1. The base support plate 34 includes a pair of upwardly directed end brackets 50 attached rigidly thereto as shown in FIGS. 2 and 2A. Each end bracket 50 includes a pair of holes 52 therethrough for receiving a pair of rods 54 which are rigidly held within the holes 52 by means of the set screws 56. The rods 54 are of constant diameter for their entire lengths and are arranged mutually parallel for a purpose that will be set forth below.

The turret assembly 30 is journaled for rotation in a turret housing 60 by means of the bearings 62. Each end of the turret housing 60 has two legs 64 which project downwardly, as viewed in FIGS. 2 and 2A, toward the base support plate 34. Each leg 64 has a hole 66 formed therethrough for receiving one of the rods 54. The holes 66 are sized to be a slip fit with their respective rods 54 so that the turret housing 60 is free to slide back and forth on the rods 54 for a distance of about 3.8 inches or so as best seen in FIG. 2. If desired, the holes 66 may contain linear bearings that engage the rods 54 for a more smooth action or the holes 66 and rods 54 may be replaced by a suitable linear slide mechanism of the type that is commercially available.

A spline shaft 70 is disposed between the two rods 54, parallel therewith, and is arranged to rotate the turret assembly 30. The spline shaft 70 is powered by a drive shaft 72 by means of a pair of bevel gears 73 and 74, the latter of which is keyed to the shaft 72. The drive shaft 72 is driven by a stepper motor, not shown, that is controlled by the automated machine 10. The bevel gear 73 includes a bore in mating engagement with the spline of the spline shaft 70, and is journaled for rotation in the block 71, which in turn is rigidly attached to the base support plate 34. A pair of snap-rings 69 are disposed on either side of the block 71 and fit into suitable grooves in the outside diameter of the hub of the bevel gear 73 and serve to limit axial movement of the gear. The other end of the spline shaft 70, the right end as viewed in FIG. 2, has a turned down end 75 which is journaled for rotation in the right most leg 64. The turned down end 75 terminates in a shoulder 77, against which a timing belt pulley 76 is disposed. A snap ring 79 is disposed in a groove formed in the end of the turned down end 75 so that the timing belt pulley 76 and the right leg 64 are sandwiched between the shoulder 77 and the snap ring 79 thereby limiting axial movement of the spline shaft 70 with respect to the turret housing 60. With this arrangement, as the turret housing 60 moves along the rods 54, the spline shaft 70 moves a corresponding amount along its axis through the mating bore of the bevel gear 73. A clearance hole 81 is provided in the bracket 51 to permit the spline shaft 70 to project therethrough, in concert with the back and forth movement of the turret housing 60, while remaining rotationally coupled to the shaft 70.

The turret assembly 30 includes a turret body 80 having diameters 82 and 84 which engage the inner diameters of the bearings 62 as shown in FIG. 2. Another timing belt pulley 86, which is matched with the pulley 76, is disposed on the diameter 84 along side the rightmost bearing 62. A nut 87 is threaded onto the rightmost end of the turret body 80 to secure the inner race of the bearing 62 and the pulley 86 to the body 80 by forcing the pulley 86 against a shoulder 88. Similarly, a nut 90 is threaded to the other end of the turret body 80 thereby forcing the inner race of the leftmost bearing 62 against a shoulder 92 thereby securing that inner race to the body. The outer races of the bearings 62 slip into bores in the turret housing 60 and the assembly is retained there by the retaining ring 94. A timing belt 96 is in driving engagement with the pulleys 76 and 86 so that the turret body 80 may be selectively rotated about an axis 100 by the stepper motor, not shown, by means of the shafts 70,72, and the bevel gears 74. This selective rotation may be affected independently of the position or movement of the turret housing 60 along the rods 54, except as noted below.

The wire selection and feed unit 14 includes a linear actuator 102, such as for example an air cylinder, which is attached to the end bracket 50 of the base support plate 34 by any suitable means. The piston rod 106 of the air cylinder 102 is attached to the turret housing 60 by means of a threaded hole and lock nut 108, and is arranged to move the turret assembly back and forth along the rods 54 under control of the automated machine 10.

Figure 3:
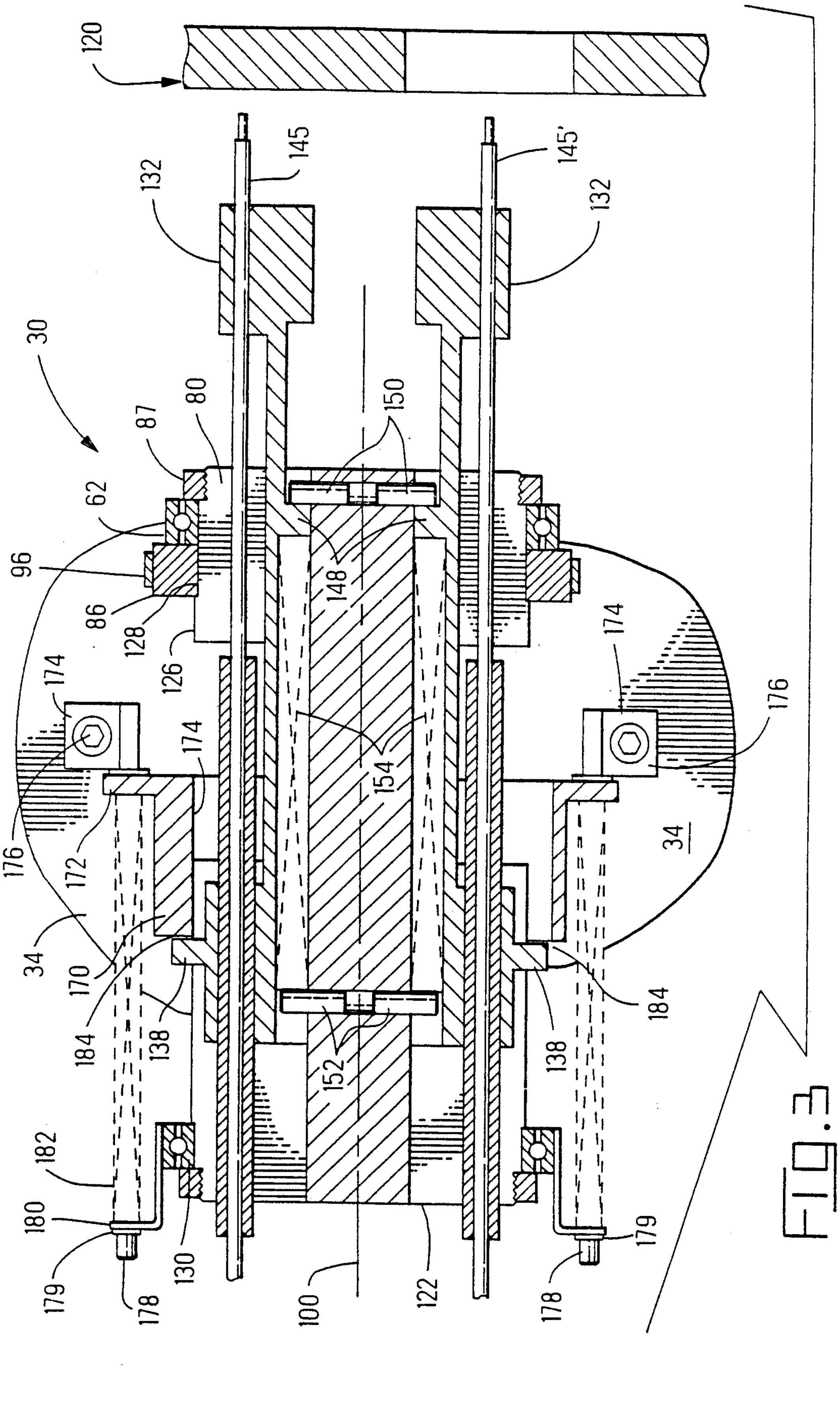
FIG. 3 is a cross-sectional view of a portion of the wire selection and feed unit of FIG. 2 showing all wire holders fully retracted.
Figure 3A:
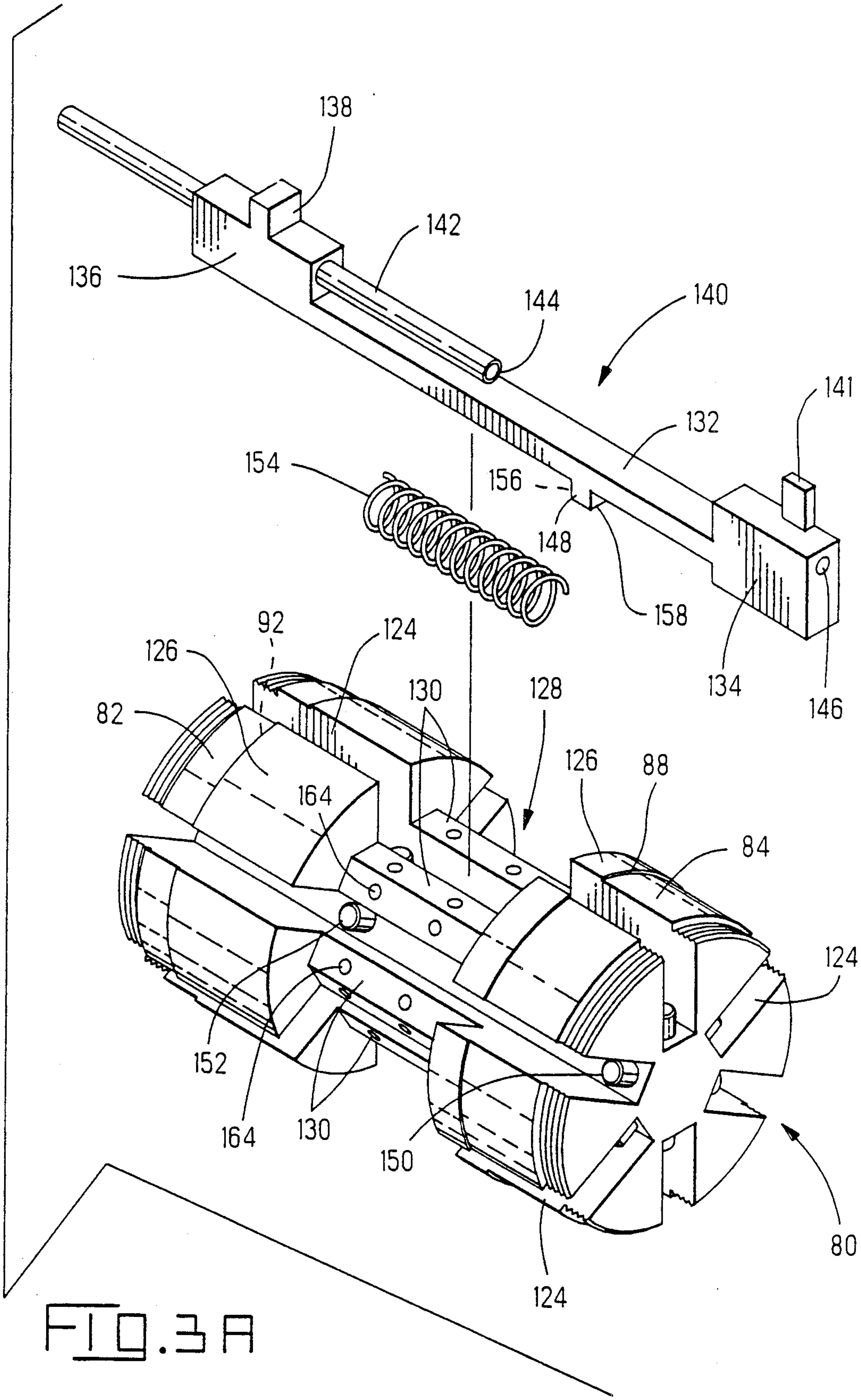
FIG. 3A is an isometric view of the turret body and a wire holder shown in FIG. 3.
Figure 4:
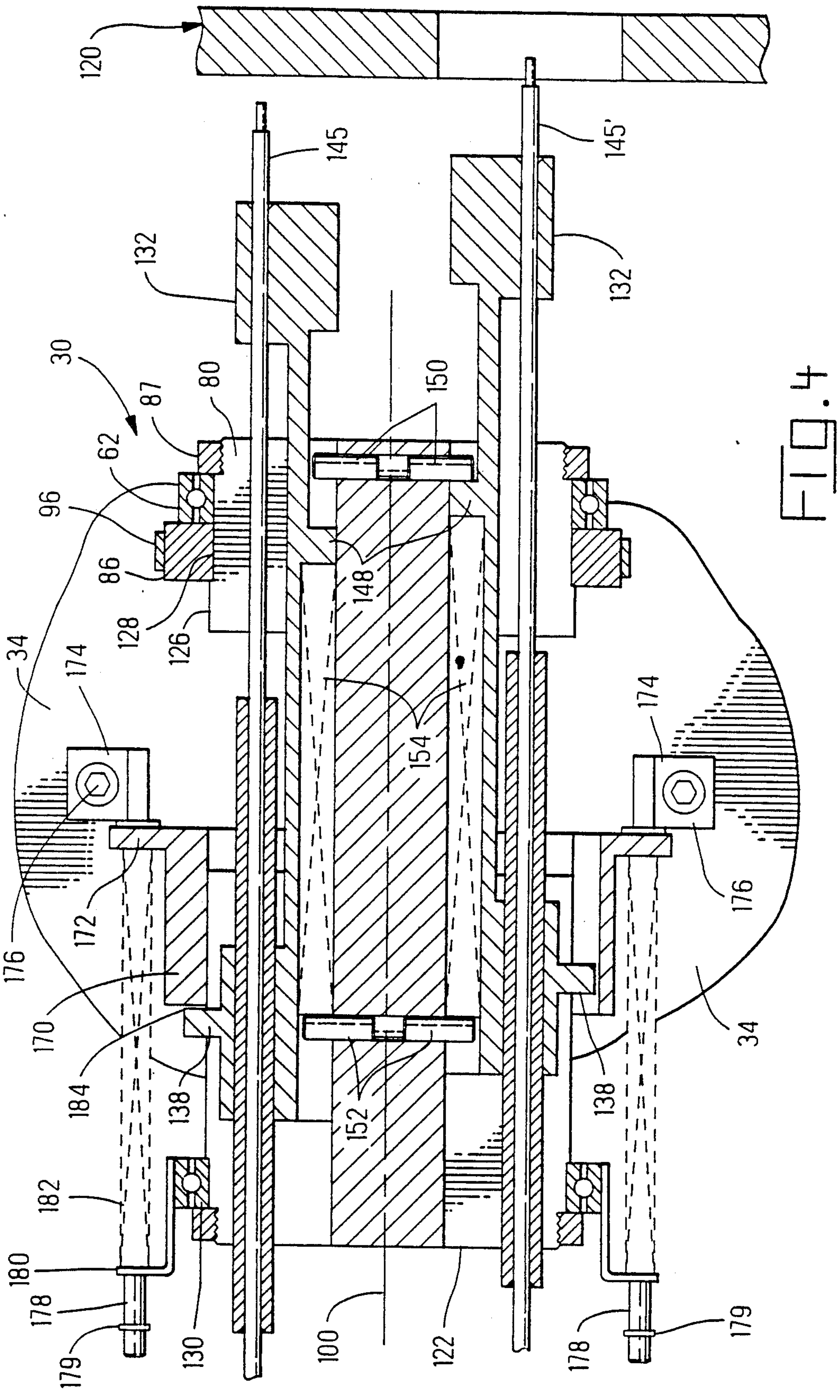
FIGS. 4 and 5 are similar views to those of FIG. 3 showing one wire holder partially advanced and fully advanced, respectively.
Figure 5:
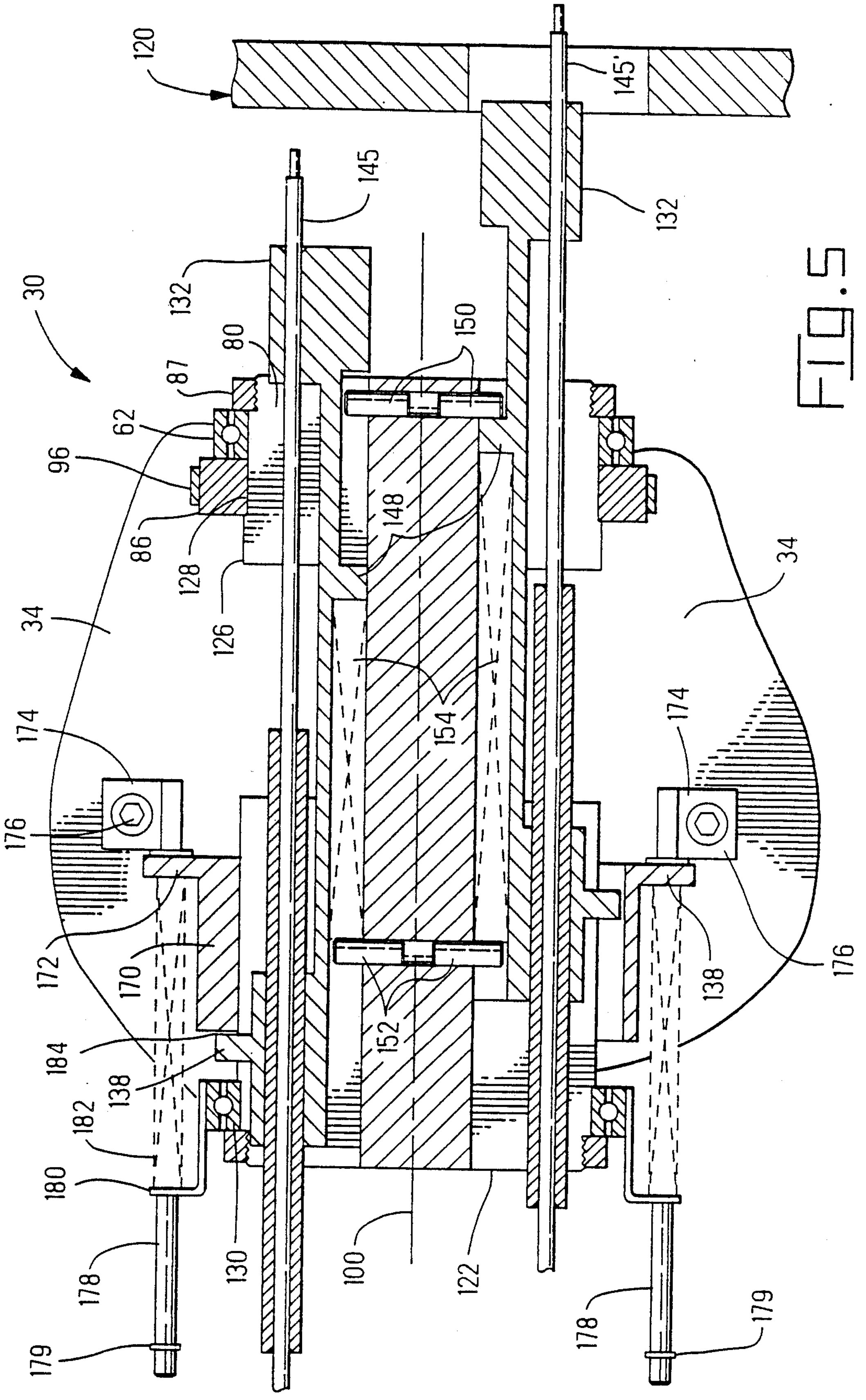

The turret assembly 30 is shown in FIGS. 3, 4, and 5 in cross section which should be viewed in conjunction with FIGS. 2A and 3A. A generic work station 120 is also shown, which may be a press, a wire cutting and stripping device or the like, to illustrate how the turret assembly 30 interacts with the automated machine 10. The turret assembly 30 includes the body 80, as best seen in FIG. 3A, having a plurality of radially disposed slots 124, six in the present example, however, a turret having twelve or more such slots would be suitable. The turret body 80 is of substantially cylindrical shape having a major diameter 126, a first stepdown diameter 84 disposed at the right end of the body 80, as viewed in FIGS. 3 and 3A, and a second stepdown diameter 82 disposed at the left end thereof. An undercut 128 is formed in the surface of the major diameter 126 terminating in flat surfaces 130 on each side of the slots !24 thereby forming a somewhat hexagonal cross-section as shown in FIG. 2A. Each slot 124 includes a wire holder 132 which is sized to freely slide within its slot in a direction that is parallel to the axis 100. The wire holder 132, as best seen in FIG. 3A, includes a right end 134 and a left end 136 having a rearward stop tab 138 projecting outwardly therefrom. An opening 140 is disposed in the holder 132, between the two ends 134 and 136. A wire guide 142, for holding and guiding a wire, consists of a length of tubing projecting through a hole formed in the end 136, substantially parallel to the longitudinal axis of the wire holder 132. The internal bore 144 of the wire guide 142 is sized to accept a range of wire sizes such as, for example, 0.050 to 0.105 inches. A guide opening 146, which in the present example is a hole having a diameter equal to the diameter of the bore !44, is disposed through the end 134 in alignment with the bore 144 and will receive a length of wire 145, as shown in FIGS. 3, 4, and 5 and will position the wire within the opening 140 approximately parallel to the turret axis. The wire holder 132 also includes a forward stop tab 148 projecting therefrom in a direction opposite the opening 140.

Figure 6:
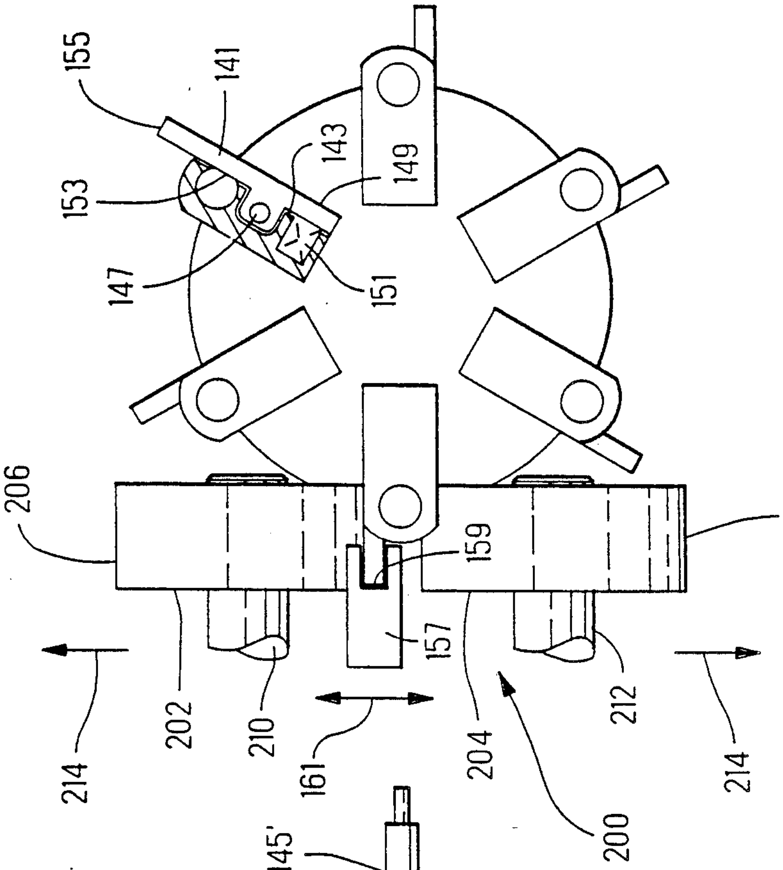
FIG. 6 is an end view of the turret showing the wire feed mechanism.
Figure 7:
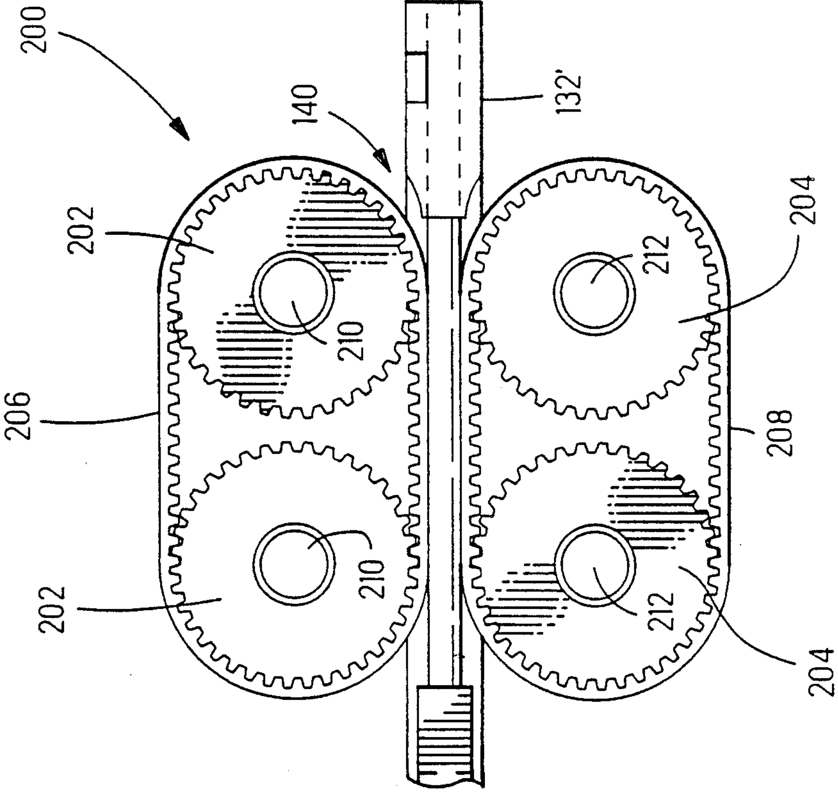
FIG. 7 is a side view of the wire feed mechanism.

Each wire holder 132 includes a wire clamp 141 which is disposed within a cutout 143 formed in the end of the wire holder as best seen in FIGS. 6 and 7. The clamp 141 includes a shank 145 which is pivotally attached to the wire holder 132 by means of a pin 147, and a pair of tabs which extend on either side of the shank. One of the tabs 149 is in engagement with a spring 151 which is disposed within the cutout 143 and urges the clamp 141 to pivot counterclockwise as viewed in FIG. 6. This causes a surface 153 of the other tab 155 to clampingly engage the wire 145. A yoke 147 having a cutout 159 is arranged to surroundingly engage the tab 155 when the wire holder 132' is extended as shown in FIG. 7. The yoke 157 is further arranged to undergo movement as indicated by the arrows 161 under control of the machine 10 so that when the wire feed mechanism 200 is in feeding engagement with the wire 145', the yoke 157 moves the tab 155 upward a slight amount to release the wire for feeding. Similarly, the yoke 157 can be moved downwardly a slight amount to apply more clamping pressure to the wire during insulation stripping.

Each slot 124 of the body 80 contains a pair of pins, a forward stop pin 150 and a spring abutment pin 152. As can be seen in FIGS. 3 and 3A, when the wire holder 132 and a coil compression spring 154 are assembled within the slot 124, the spring 154 is slightly compressed between the spring abutment pin 152 and the rear wall 156 of the forward stop tab 148, urging the opposite wall 158 against the forward stop pin 150. The pins 150 and 152 project from holes in the bottom of the slots 124 and may be removably assembled thereto by means of a slip fit with the holes or by threading the lower ends of the pins into the holes. The wire holders 132 and springs 154 are maintained within their respective slots 124 by means of retaining plates 160 as best seen in FIG. 2A. A pair of such retaining plates 160 are attached to the surfaces 130 on either side of each slot 124 by means of screw fasteners 162 threaded into holes 164 formed in the body 80. The retaining plates 160 overlap a portion of each side of the slot 124 in the area of the opening 140 thereby captivating the wire holder 132 within the slot 124, yet permitting longitudinal movement of the holder within the slot.

A cylindrical shaped stop collar 170 having a flange 172 and an internal bore 174 is disposed around the major diameter 126 of the body 80, as best seen in FIGS. 2A and 3. The bore of the stop collar 170 is sized to permit the body 80 to slide within the bore in a direction along the axis 100. Additionally, the bore includes a cutout 175 for the length of the stop collar !70 for a purpose that will be explained below. A pair of angle brackets 174 are rigidly attached to the base support plate 34 by means of the screw fasteners 176, in a position to engage the flange 172 on each side of the body 80, as shown in FIGS. 2A and 3. A pair of guide pins !78 are attached to and projects from the flange 172, on each side thereof, in a direction to the left as viewed in FIG. 3. A pair of guide brackets 180, one of which is rigidly attached to each side of the turret housing 60, have clearance holes therein to permit the pins 178 to project therethrough. A compression spring 182 is arranged around each pin 178 so that the spring is compressed between the guide pin bracket 180 and the flange 172, thereby urging the flange 172 against the angle brackets 174. A snap ring retainer 179 is attached to the ends of the pins 178, as shown in FIGS. 3, 4, and 5 to retain the stop collar 170 captive.

FIGS. 6 and 7 schematically depict a wire feed mechanism 200 arranged for engaging and feeding the wire 145' a desired amount along its longitudinal axis under the control of the automated machine 10. The feed mechanism 200 includes two pairs of timing belt rollers 202 and 204 which are in operational engagement with two timing belts 206 and 208. The four rollers 202,204 are arranged for rotation on the shafts 210 and 212. At least one of the shafts 210 or 212 is drivingly coupled to its respective roller 202,204 and is driven by a stepper motor, not shown, which is controlled by the machine 10. The other rollers 202,204 are journaled as idler rollers. The shafts 210 and 212 are arranged to move in opposite directions away from the wire 145' as indicated by the arrows 214 in FIG. 6, a sufficient distance so that the rollers 202 and 204 and the belts 206 and 208 clear the turret assembly 30 and permit rotation thereof. Additionally, the shafts 210 and 212 are further arranged to move toward the wire 145' to the position shown in FIGS. 6 and 7, in wire feeding engagement with the wire 145'.

As best seen in FIG. 7, the wire feed mechanism 200 is arranged to engage the wire 145' within the opening 140 of the extended wire holder 132'. While the mechanism for moving the shafts 210 and 212 is not shown here, any suitable mechanism for doing so that is known in the art may be used. Moreover, other suitable wire feeding mechanisms may be used such as, for example, wire engaging drive wheels instead of the rollers and belts arrangement disclosed above.

The operation of the wire selection and feed unit 14 will now be described with reference to FIGS. 1 through 7. As shown in FIG. 3, the turret assembly 30 is fully retracted to the left, the piston rod 106 being withdrawn as far as possible within the cylinder 102. The springs 154 urge the forward stop tabs 148 of the wire holders 132 against the forward stop pins 150 thereby leaving a small amount of clearance 220 between the rearward stop tabs 138 and the stop collar 170. At this point the automated machine 10 may select a desired wire for processing by rotating the turret body 80 by means of the drive shaft 72, bevel gears 74, spline shaft 70, pulleys 76 and 86, and the timing belt 96, until the wire holder 132 containing the desired wire is in the nine o'clock position as viewed in FIG. 2A. Note that the nine o'clock position for wire selection and feeding is purely arbitrary, and may be any clock position about the rotating turret that will permit proper engagement of the wire feed mechanism 200. While the turret is being rotated to select a desired wire, the complete turret assembly 30 is rotated on its base 32, by the machine 10, to position the turret adjacent a desired work station 120, such as for example, one of the presses 16 or 18, or the wire cutting and stripping station 20. As the cylinder 102 is pressurized the piston rod 106 begins to move the turret assembly 30 to the right, as viewed in FIG. 4, wherein the turret housing 60 slides along the two rods 54. Note that, as the body 80 moves to the right, the wire holder 132' advances toward the work station 120 while the other wire holders 132 remain substantially stationary with respect thereto. This is because the rearward stop tabs 138 of the wire holders 132 abut the stop collar 170 which in turn is in abutting engagement with the angle brackets 174, however, the tab 138' of the wire holder 132' is free to move into the cutout 175 since the spring 154' continues to urge the forward stop tab 148' against the pin 150'. while this process is occurring, the springs 154 of the stationary wire holders 132 compress by an amount equal to the rightward movement of the turret body 80. Additionally, the springs 182 compress by a similar amount as the brackets 180, which are attached to the turret housing 60, move to the right, as viewed in FIG. 4.

Rightward movement of the turret housing 60 continues until the wire holder 132' is fully extended, thereby presenting the end of the wire 145' to the work station 120 for processing, as shown in FIG. 5. Upon completion of the wire processing step at the work station 120, the pressure in the cylinder 102 is reversed thereby causing the piston rod 106 to move the turret housing 60 in the opposite direction toward the end bracket 51. This movement causes the springs 154 of the non-extended wire holders 132 to expand an amount equal to the amount of movement of the turret housing 60, while the extended wire holder 132' follows the body 80 in its leftward movement. Such movement continues until the turret assembly 30 is in its position as shown in FIG. 3. At this point, the rearward stop tab 138' has fully retracted from the opening 175 and is clear of the stop collar 170. The automated machine 10 may now select another wire for processing by rotating the turret body 80 within the bearings 62 by means of the drive shaft 72, bevel gears 74, spline shaft 70, pulleys 76 and 86, and the timing belt 96, until the wire holder 132 containing the desired wire is in the nine o'clock position as viewed in FIG. 2A. This aligns the rearward stop tab 138' of the selected wire holder 132' with the opening 175 thereby permitting the wire holder 132' to advance the wire 145' to a desired work station 120 when the cylinder 102 is pressurized to advance the turret housing 60.

After processing a first end of the wire 145' the wire selection and feed unit 14 is rotated by means of the bearings 44 by the automated machine 10 to position the turret assembly 30 so that the wire 145' is in alignment with a wire receiving mechanism 230, as best seen in FIG. 1. The wire holder 132' is then extended as shown in FIG. 5, if not already extended, the wire feed mechanism 200 is then brought into wire feeding engagement with the wire 145' and the wire feed a desired amount into and through the wire receiving mechanism 230. The cutting and stripping station 20 is then activated by the machine 10 to sever and strip a wire segment 232 from the fed wire 145'. The conveyor 26 may then transport the wire receiving mechanism 230 and its associated wire segment 232 downstream to other work stations of the machine 10.

Figure 8:
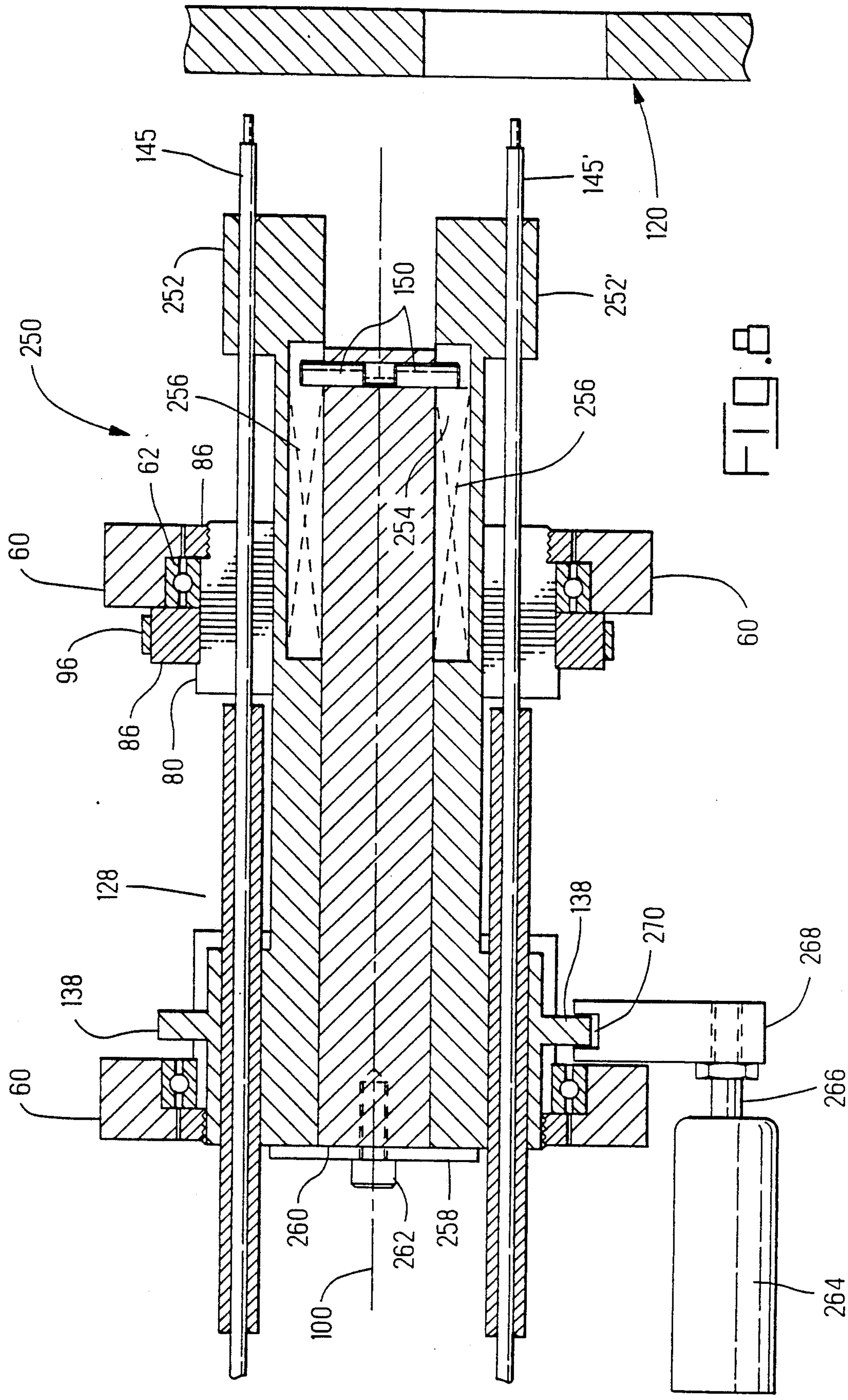
FIGS. 8 and 9 are similar views to those of FIGS. 3 and 5 respectively showing a second embodiment of the invention.
Figure 9:
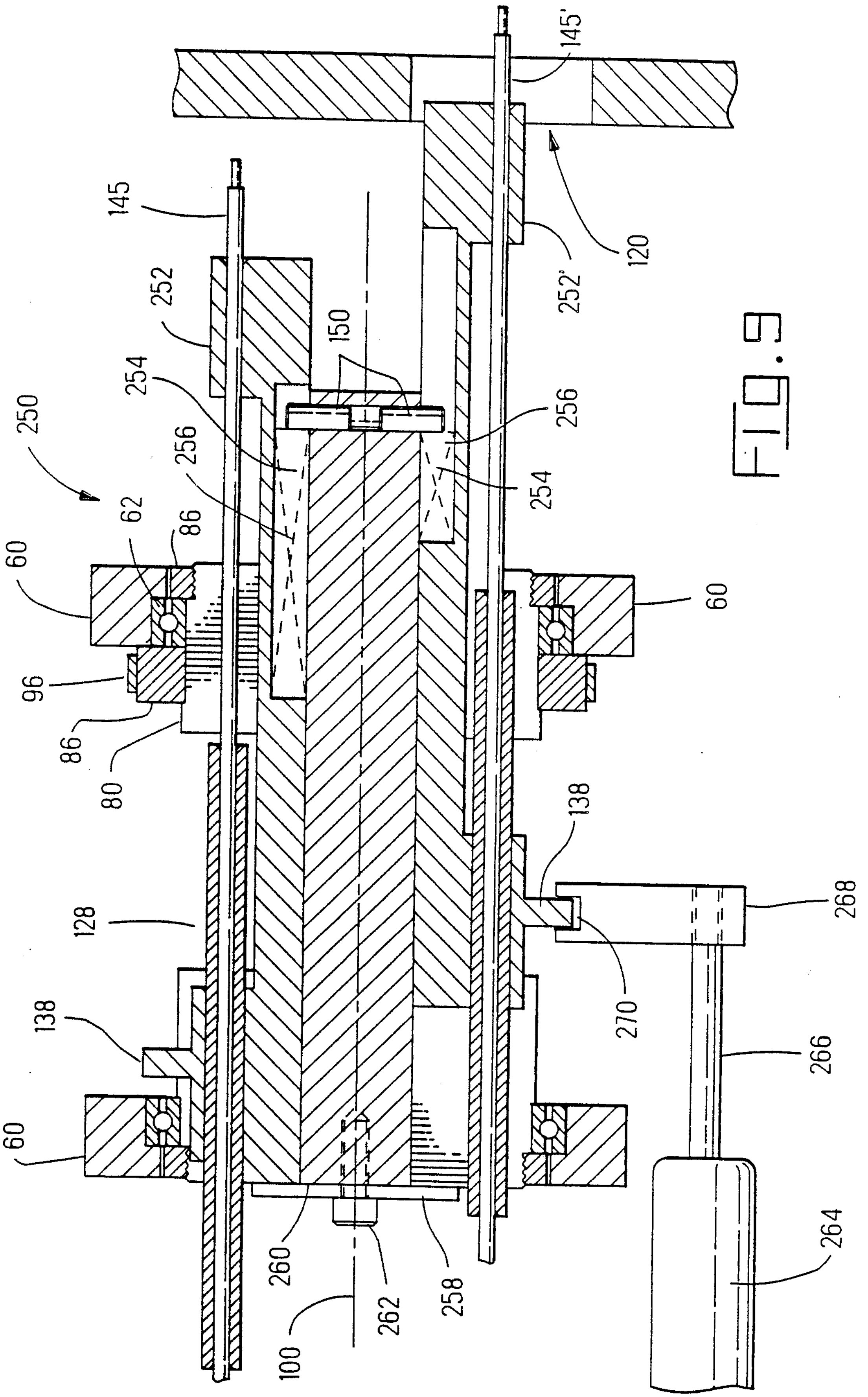

A second embodiment of the turret assembly is shown in FIGS. 8 and 9, and identified as 250, where similar parts in both embodiments have the same identifying numbers.

As is shown, the stop collar 176, angle brackets 174, pins 178, guide brackets 180, and springs 182 of the turret assembly 30 are omitted from the turret assembly 250. Additionally, the turret housing 60 is rigidly attached to the base support plate 34 instead of being in sliding engagement with the rods 54. Each wire holder 252 has a forward opening 254 containing a compression spring 256 disposed between the pin 150 and the back wall of the opening 254. The spring 256 thereby urges the wire holder 252 to the left, as viewed in FIGS. 8 and 9, into abutting engagement with a limit stop 258. The limit stop 258 is either in a circular or hexagonal shaped plate which is attached to the end 260 of the body 80 by means of the screw fastener 262 and serves to limit longitudinal movement of the wire holders 252 within the slots 124 in a direction away from the work station 120.

A linear actuator 264, such as an air cylinder for example, is secured to the base support plate 34 or the turret housing 60 by any suitable means. The air cylinder 264 includes a piston rod 266 which extends in a direction parallel to the axis 100 and is attached to a yoke 268 by suitable means such as a threaded end and lock nut. The yoke 268 includes a U-shaped channel 270 having a width slightly larger than the thickness of the rearward stop tab 138. The cylinder 264 and yoke 268 are positioned so that when the piston rod 266 is completely retracted, as shown in FIG. 8, the channel 270 is aligned with the stop tab 138 that is associated with the wire holder 252 that is in the nine o'clock position, similar to the position of the wire holder 132, in FIG. 2A. The air cylinder 264 may be pressurized to either extend the piston rod 266 and associated yoke 268 to cause the wire holder 252', which is in the nine o'clock position, to extend the end of the wire 145' into the work station 120 as shown in FIG. 9, or to retract the piston rod to the position shown in FIG. 8. The pressurization of the cylinder 264 is effected by the automated machine 10.

As with the turret assembly 30, the body 80 is rotated, under the control of the machine 10, until a wire holder 252' having a desired wire, is in the nine o'clock position. The wire holder 252, is then extended by the cylinder 264. At this point the end of the wire 145' may be processed in the work station 120 and/or the wire 145 may be fed a desired amount by bringing the wire feed mechanism 200 into feeding engagement with the wire 145' in a manner similar to that set forth above for the turret assembly 30.

As will be recognized by those skilled in the art, there are several different structural variations of the wire selection and feed unit 14. Such variations may include a wire holder 132,152 having a circular or other cross section rather than the present rectangular one, or a wire feed mechanism 200 that effects movement of the wire 145' by engaging the wire with rotating drive wheels instead of the two moving timing belts 206,208. Additionally, the teachings of the present invention could advantageously be utilized in a turret assembly having twelve or more selectable wire holders.

An advantage of the present invention is that the rotating portion of the turret assembly can be made relatively small and compact thereby reducing the rotational inertia of this unit as opposed to prior art wire selection and feed units. This, of course, permits relatively high speed operation and low cycle time. Additionally, due to the low mass, compact structure, the unit may be easily and quickly manipulated by the machine 10 to present the wire 145' to a variety of three, or more, different work stations. Also, the turret may be rotated to select a desired wire concurrently with moving the unit to another work station thereby further reducing cycle time. Another important advantage of the present invention is the movable wire holder that will advance and present the end of the selected wire to a work station and, when the work station is a wire cutting and stripping unit, will retract pulling the wire back from the stripping tool thereby stripping the insulation from the end of the wire.

We claim:

1. In an automated cable making machine a first work station for processing an end of a wire selected from a plurality of different wires a wire select and feed apparatus comprising:

(a) a frame attached to said machine;

(b) a turret journaled for rotation with respect to said frame about a turret axis;

(c) a plurality of wire holders associated with said turret, angularly spaced about and extending parallel to said axis, each of which is arranged to hold and guide one of said wires with the axes of the wires extending parallel to said turret axis;

(d) means for rotating said turret until one wire holder having a selected wire is in a feed position;

(e) wire holder moving means for moving only said one wire holder in a direction parallel to said turret axis toward said first work station and in an opposite direction; and (f) wire feeding means for engaging said selected wire and feeding said selected wire along its longitudinal axis a desired amount in a direction toward said work station.

2. The apparatus according to claim 1 including means for clamping said selected wire to said one wire holder and means for disabling said clamping means when said wire feeding means is in engagement therewith.

3. The apparatus according to claim 2 wherein said holder includes first and second spaced apart wire guide means for maintaining a portion of said wire in substantial alignment with the wire's longitudinal axis, and wherein said wire feeding means engages said portion of said wire to effect said movement.

4. The apparatus according to claim 3 wherein said longitudinal axis of said portion of said wire is substantially parallel to said turret axis.

5. The apparatus according to claim 1 wherein said wire holder moving means for moving only said one wire holder comprises:

(a) a stop tab projecting from each wire holder;

(b) a stop collar arranged to abuttingly engage each stop tab thereby restraining said wire holder from moving toward said work station except for the stop tab of a wire holder in said feed position;

(c) coupling means for resiliently coupling each of said wire holders to said turret; and (d) means for moving said turret in a direction along its axis toward said work station so that said resilient means urges the wire holder in said feed position toward said work station and urges said stop tabs of all other wire holders into said abutting engagement with said stop collar.

6. The apparatus according to claim 5 wherein said coupling means comprises a compressing spring disposed adjacent each wire holder between a first stop surface attached to said turret and a second stop surface attached to said wire holder thereby urging said wire holder in a direction toward said work station.

7. The apparatus according to claim 6 wherein said stop collar includes an abutting surface having an opening so that when said turret is moved along its axis toward said work station, only said stop tab of said wire holder in said feed position enters said opening.

8. The apparatus according to claim 1 wherein said wire holder moving means for moving only said one wire holder comprises:

(a) a stop tab projecting from each wire holder; and (b) actuator means for engaging said stop tab of only said wire holder in said feed position and effecting said movement thereof.

9. The apparatus according to claim 8 wherein said actuator means includes a linear actuator having a piston rod arranged to move in a direction substantially parallel to said turret axis and a yoke attached to the end of said piston rod for said engaging of said stop tab.

10. The machine according to claim 1 including a second work station and said wire select and feed apparatus including means for moving said turret in a direction lateral to said turret axis to a first position adjacent said first work station and in another direction to a second position adjacent said second work station so that when in said first position said wire holder moving means for moving said one wire holder moves in a direction toward said first station, and when in said second position said wire holder moving means for moving said one wire holder moves in a direction toward said second station.

11. The apparatus according to claim 5 including means for moving said wire select and feed apparatus so that said turret is adjacent a desired work station, wherein said means for rotating said turret is arranged to rotate concurrently with said movement of said apparatus.

* * * * *